United States Patent [19]

Schilling

[11] 3,851,808

[45] Dec. 3, 1974

[54] TRAY HAVING AN EXTRUDED EDGE

[75] Inventor: Paul K. Schilling, St. Paul, Minn.

[73] Assignee: Plastics, Inc., St. Paul, Minn.

[22] Filed: Sept. 8, 1972

[21] Appl. No.: 287,498

[52] U.S. Cl. .............................. 224/48 R, 206/72
[51] Int. Cl. ................................... A47g 23/06
[58] Field of Search ...... 224/46 T, 48 R, 48.1–48.5, 224/48.6, 48.7, 48 W; 206/72; 40/152

[56] References Cited
UNITED STATES PATENTS

| 300,472 | 6/1884 | Higbee | 224/48 R |
| 1,436,256 | 11/1922 | Himmelfarb | 224/48 R |
| 1,520,024 | 2/1923 | Himmelfarb | 224/48 R |
| 2,662,382 | 12/1953 | Potchen | 224/48 R |
| 3,408,759 | 11/1968 | Rotheraine et al. | 40/152 |

Primary Examiner—Robert J. Spar
Assistant Examiner—Kenneth Noland
Attorney, Agent, or Firm—Robert M. Dunning

[57] ABSTRACT

A tray is provided having a peripheral frame of extruded plastic material. The frame includes an upwardly and outwardly inclined wall provided with a vertical wall near its lower extremity spaced upper and lower flanges define an inwardly opening channel which engages the marginal edges of a bottom panel. The extrusions forming the side and end walls are secured together at the corners.

1 Claim, 5 Drawing Figures

PATENTED DEC 31 1974 3,851,808

TRAY HAVING AN EXTRUDED EDGE

This invention relates to an improvement in a tray having an extruded edge, and deals particularly with a simple and inexpensive structure which may be used as a serving tray or the like.

BACKGROUND OF THE INVENTION

Trays have been made of a great many different types of material. Many types of trays have been made of molded plastic. While the amount of plastic material used in molding a plastic tray is relatively small, obviously the molding operation is costly because of the area of the molded parts. As molding operations of this type require a predetermined time cycle, the same amount of time is usually required to mold a tray as is required to mold a large number of individual parts of smaller dimensions.

Plastic extrusions, on the other hand, are relatively inexpensive in view of the fact that the molton plastic is forced through a die of predetermined shape and the extruded material may be cut to suitable lengths. A long strip of extruded plastic may be formed in the time required to mold an object such as a tray. Thus it has been found feasible and practical to form trays having peripheral walls formed of extruded plastic material and including a bottom panel formed of stiff paperboard, die cut corrugated foam, die cut styrene sheet or other similar material. The various sides of the tray may be secured together in the form of mitered corners, or in the form of rounded corners in the event the extruded plastic may be bent. Also, it is possible to form rounded corner portions connecting the various sides and ends of the tray and sealed to the side and end walls of the tray in any suitable manner such as by heat and pressure, or by a suitable adhesive or solvent.

Accordingly, the present invention resides in the provision of a tray formed of portions which may be extruded to include an inwardly facing groove designed to accommodate the marginal edges of the panel of the tray. When the extruded portions are secured together, the panel is in position, and a low cost tray is produced.

These and other objects and novel features of the present invention will be more clearly and fully set forth in the following specification and claims.

DESCRIPTION OF THE PREFERRED EMBODIMENT

Figure 1:
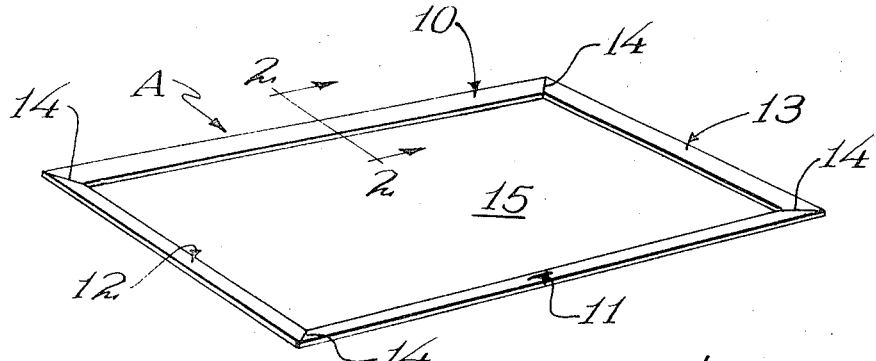
FIG. 1 is a perspective view of a tray showing the general construction thereof.
Figure 2:
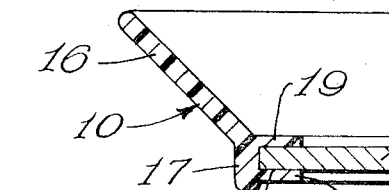
FIG. 2 is a sectional view through a wall of the tray, the position of the section being indicated by the line 2—2 of FIG. 1.

The tray A which is indicated in FIGS. 1 and 2 of the drawings include parallel side walls 10 and 11 and parallel end walls 12 and 13, all of which are of the same cross-sectional shape. These side and end walls are connected along mitered corners 14, and are secured together in any suitable manner. If the side and end walls are formed of thermoplastic material they may be sealed together by inserting a heated blade between the adjoining edges of the mitered corners to heat these edges above or near the melting point of the material, and then forcing the heated edges together to adhere them in face contact. Similarly, the mitered corners may be adhered together through the use of a solvent or a suitable adhesive. Prior to the completion of the forming of the tray frame, a bottom panel 15 is inserted in the frame area. The marginal edges of the bottom panel 15 are supported in an inwardly facing channel which will be described.

As indicated in FIG. 2 of the drawings, each portion of the frame includes an inclined wall 16 which inclines upwardly and outwardly at an angle of about 45 degrees, and which is provided at its lower end with a flange or vertical wall portion 17. The flange portion 17 supports a pair of parallel vertically spaced inwardly extending flanges 19 and 20 which define a channel 21 designed to accommodate the marginal edges of the bottom panel 15. In preferred form, the lower of the flanges 20 is spaced somewhat above the lower extremity of the vertical portion 17 so as to provide a marginal downwardly projecting rim 22 which supports the tray.

Figure 3:
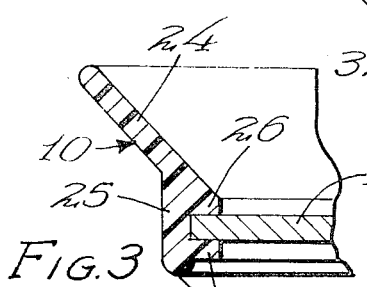
FIG. 3 is a sectional view similar to FIG. 2, but showing a slightly different wall configuration.

FIG. 3 shows a slightly modified form of construction in which the walls such as the wall 10 includes an upwardly and outwardly inclined wall portion 24 which is integrally connected to a vertical wall portion 25 at a point spaced from its lower extremity. The lower end of the inclined wall 24 thus forms the upper flange 26. A lower flange 27 is provided in spaced relation to the flange 26 to accommodate the bottom panel 15 between the flanges. The flange 27 is slightly above the lower edge of the vertical wall portion 25 to form a peripheral rim or foot 29 on which the tray is supported.

Figure 4:
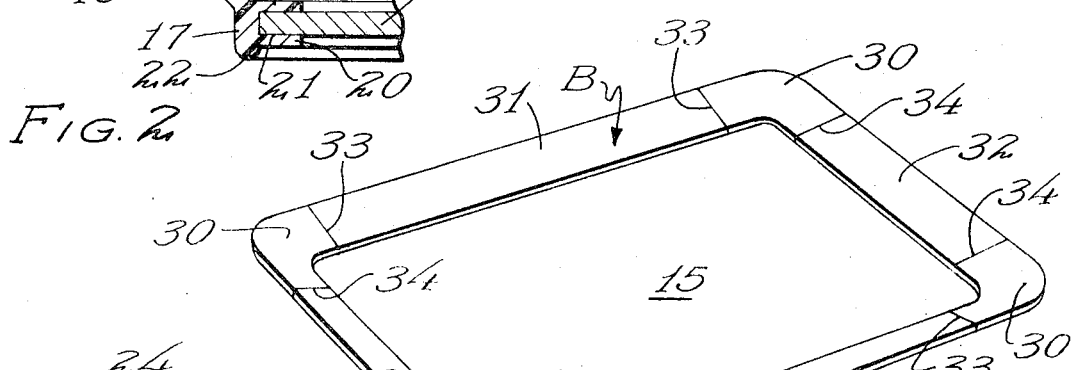
FIG. 4 is a perspective view of a modified form of tray.

The tray B shown in FIG. 4 of the drawings is similar to the tray A with the exception of the fact that there are rounded corner portions 30 which connect the side walls 31 and the end walls 32. The cross-sectional shape of the side and end walls are similar to that shown in FIGS. 2 or 3, and the corner portions 3 also have a similar configuration. When the extrusion is made of suitable material, the corner members may be made from portions of the extrusion through the use of a suitable die. As indicated, the ends 33 of the side walls 31 are parallel, as are also the ends 34 of the end wall sections 32. The corner portions form continuations of the extrusions forming the side and end walls and are secured thereto by adhesion, welding, solvent or other means such as those described.

Figure 5:
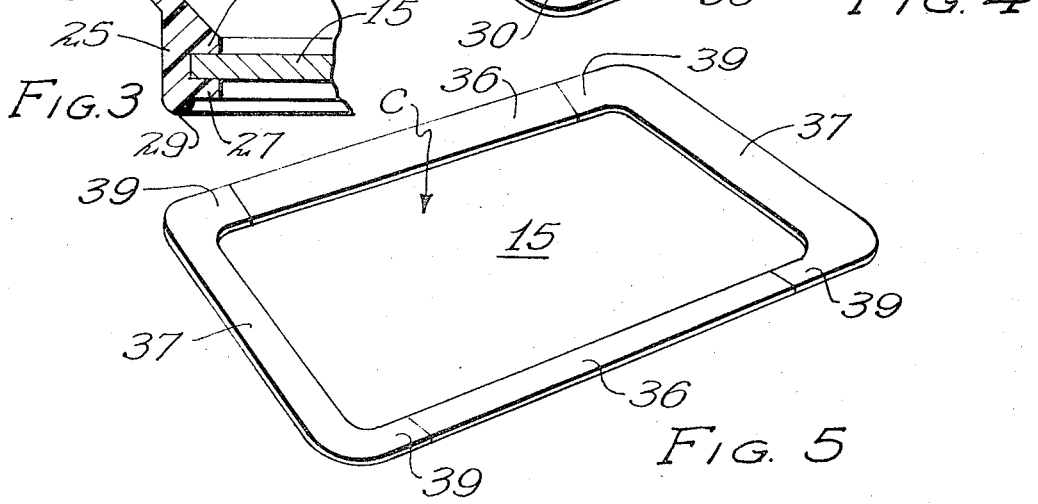
FIG. 5 is a perspective view of another modified form of tray construction.

The tray C illustrated in FIG. 5 of the drawings may also be used where the material forming the marginal edges of the tray or the extrusions are capable of being molded. In the arrangement illustrated in FIG. 5, the side walls 36 are parallel and have parallel ends. The end walls 37 are of generally U-shaped form, having right angularly turned side portions 39 at opposite sides of these end wall portions. The corner portions 39 are aligned and terminate on a common plane and are secured in abutting relation to the side walls 36. The manner of securing the walls in place may be similar to the ways described.

In accordance with the Patent Statutes I have described the principles of construction and operation of my tray, and while I have attempted to show the best embodiments thereof, I desire to have it understood that obvious changes may be made within the scope of the following claims without departing from the spirit thereof.

I claim:
1. A tray including:
   side and end walls formed of plastic and being of similar cross-sectional shape,
   said walls being integral and including a vertical wall portion,
   a pair of integral vertically spaced upper and lower flanges extending inwardly from said vertical wall portion,
   an upwardly and outwardly inclined wall portion integral with said vertical wall portion,
   a rim extending downwardly from said vertical wall portion throughout the length thereof, said rim extending below the lower surface of said flanges,
   means connecting said side and end walls to form a generally rectangular frame, and
   a bottom panel marginally engaged between said upper and lower flanges,
   said inner surfaces of said upwardly and outwardly inclined walls terminating at the inner ends of said upper flanges and the outer surface of said upwardly and outwardly inclined walls terminating at the outer surface of said vertical wall portion.

* * * * *